United States Patent
Sanada

(10) Patent No.: US 11,160,122 B2
(45) Date of Patent: Oct. 26, 2021

(54) ELECTRONIC DEVICE, WIRELESS LAN TERMINAL, AND WIRELESS LAN SYSTEM

(71) Applicant: NEC Display Solutions, Ltd., Tokyo (JP)

(72) Inventor: Kenji Sanada, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 47 days.

(21) Appl. No.: 16/608,117

(22) PCT Filed: May 31, 2018

(86) PCT No.: PCT/JP2018/021016
§ 371 (c)(1),
(2) Date: Oct. 24, 2019

(87) PCT Pub. No.: WO2018/221673
PCT Pub. Date: Dec. 6, 2018

(65) Prior Publication Data
US 2021/0105835 A1   Apr. 8, 2021

(30) Foreign Application Priority Data
Jun. 2, 2017   (WO) .................. PCT/JP2017/020590

(51) Int. Cl.
*H04W 4/00*   (2018.01)
*H04W 76/10*   (2018.01)
(Continued)

(52) U.S. Cl.
CPC ......... *H04W 76/10* (2018.02); *H04L 61/2007* (2013.01); *H04W 12/06* (2013.01); *H04W 84/12* (2013.01)

(58) Field of Classification Search
CPC ..... H04W 76/10; H04W 12/06; H04W 84/12; H04L 61/2007
(Continued)

(56) References Cited

U.S. PATENT DOCUMENTS 7,603,710 B2 * 10/2009 Harvey ............... H04L 63/1416
726/23
8,342,696 B2 * 1/2013 Ivashin .................. H04L 67/08
353/94
(Continued)

FOREIGN PATENT DOCUMENTS

EP   2 651 162 A2   10/2013
JP   2006-135987 A   5/2006
(Continued)

OTHER PUBLICATIONS

International Search Report (ISR) (PCT Form PCT/ISA/210), in PCT/JP2018/021016, dated Aug. 21, 2018.
(Continued)

*Primary Examiner* — Amancio Gonzalez
(74) *Attorney, Agent, or Firm* — McGinn I.P. Law Group, PLLC.

(57) ABSTRACT

An electronic device that is connected to a network via a wireless access point or a cable, includes a communication unit equipped with at least a wireless communication capability and a control unit that controls the communication operation of the communication unit. The control unit, while connected to the network via a wireless access point or a cable, causes the communication unit to transmit a beacon signal that includes identification information of the electronic device. The identification information includes information of an IP address that enables the electronic device to be identified on the network.

17 Claims, 11 Drawing Sheets

(51) Int. Cl.
*H04L 29/12* (2006.01)
*H04W 12/06* (2021.01)
*H04W 84/12* (2009.01)

(58) Field of Classification Search
USPC .......................................................... 370/338
See application file for complete search history.

(56) References Cited

U.S. PATENT DOCUMENTS

| | | | | |
|---|---|---|---|---|
| 9,301,326 | B2* | 3/2016 | Ogawara | H04W 12/06 |
| 9,430,177 | B2* | 8/2016 | Thangadorai | G06F 3/1423 |
| 10,148,703 | B2* | 12/2018 | Mufti | H04L 65/1076 |
| 10,405,362 | B2* | 9/2019 | Monden | H04W 76/10 |
| 10,785,528 | B2* | 9/2020 | Liu | H04N 21/4367 |
| 10,897,489 | B2* | 1/2021 | Simotas | H04L 65/4092 |
| 2007/0186105 | A1* | 8/2007 | Bailey | H04L 63/0492 |
| | | | | 713/168 |
| 2011/0222518 | A1 | 9/2011 | Ota et al. | |
| 2012/0173622 | A1* | 7/2012 | Toledano | H04L 65/4076 |
| | | | | 709/204 |
| 2016/0183317 | A1* | 6/2016 | Shao | H04W 4/80 |
| | | | | 709/227 |

FOREIGN PATENT DOCUMENTS

| | | |
|---|---|---|
| JP | 2011-135325 A | 7/2011 |
| JP | 2011-188238 A | 9/2011 |
| JP | 2013-222991 A | 10/2013 |
| JP | 2014-086997 A | 5/2014 |
| JP | 2014-175892 A | 9/2014 |
| JP | 2014-216736 A | 11/2014 |
| JP | 2016-167679 A | 9/2016 |

OTHER PUBLICATIONS

Extended European Search Report dated Apr. 29, 2020 for European Patent Application No. 18808675.5-1231.

* cited by examiner

[Figure 1]
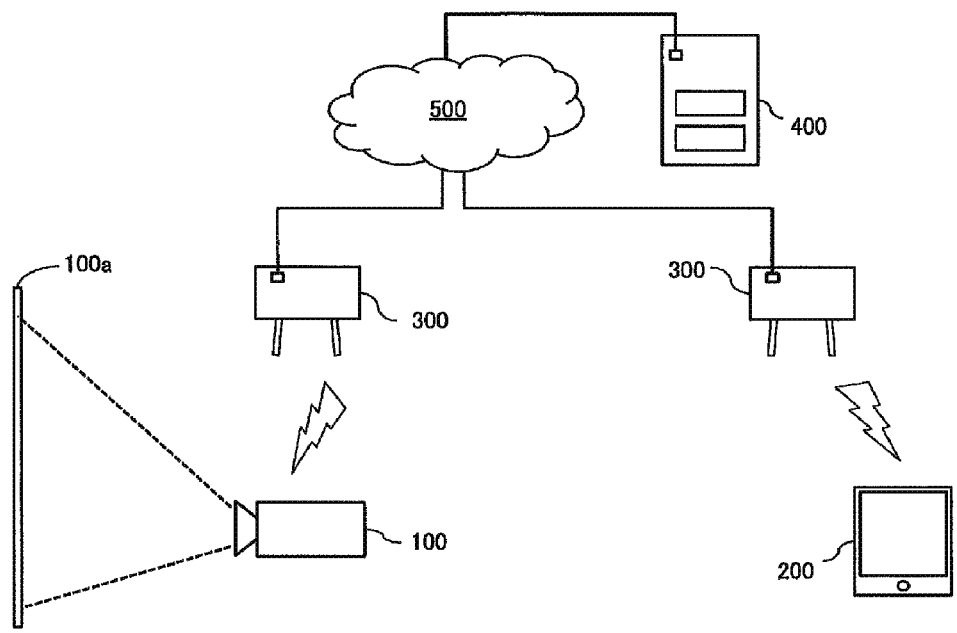

[Figure 2]
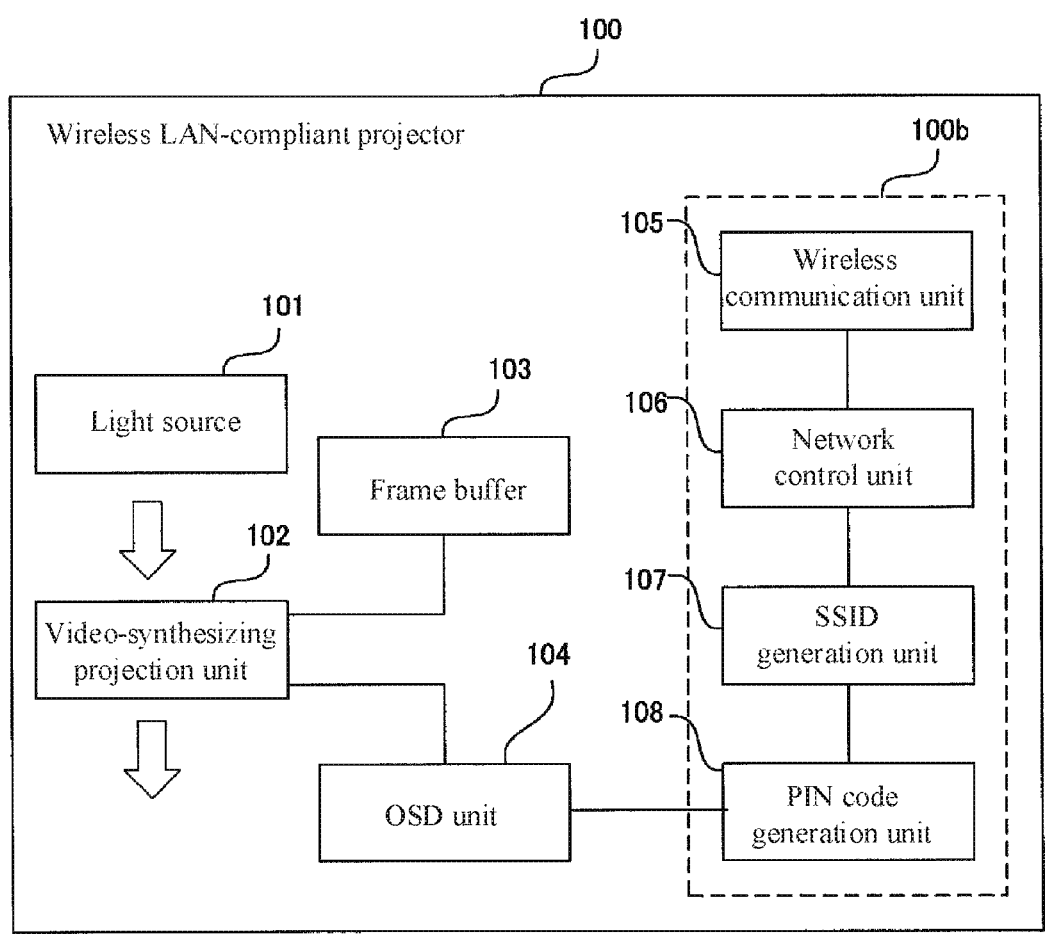

[Figure 3]
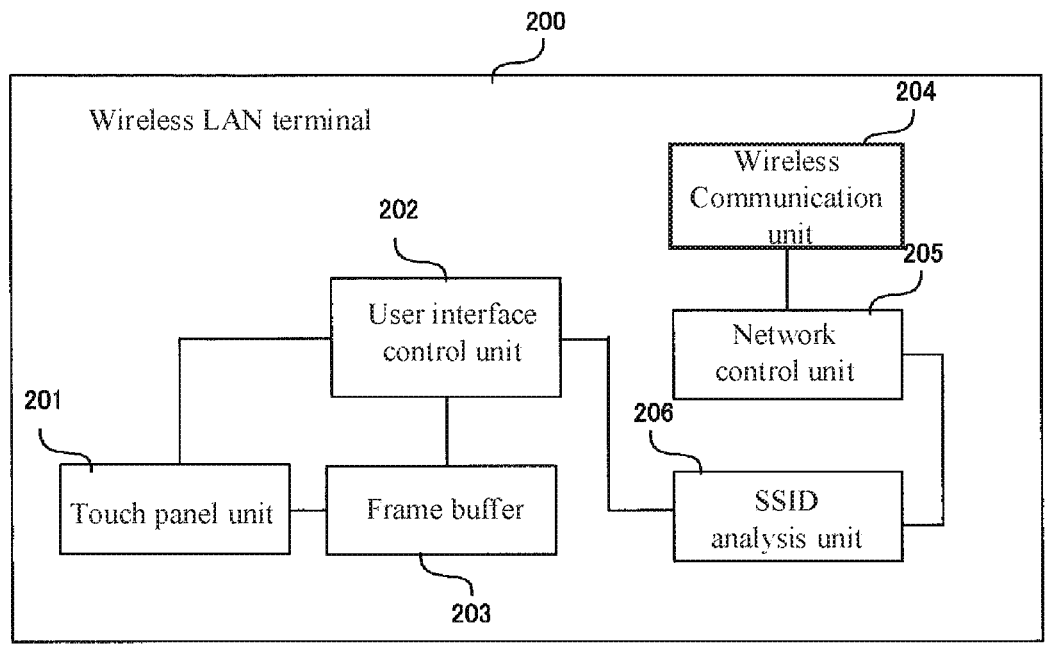
[Figure 4]
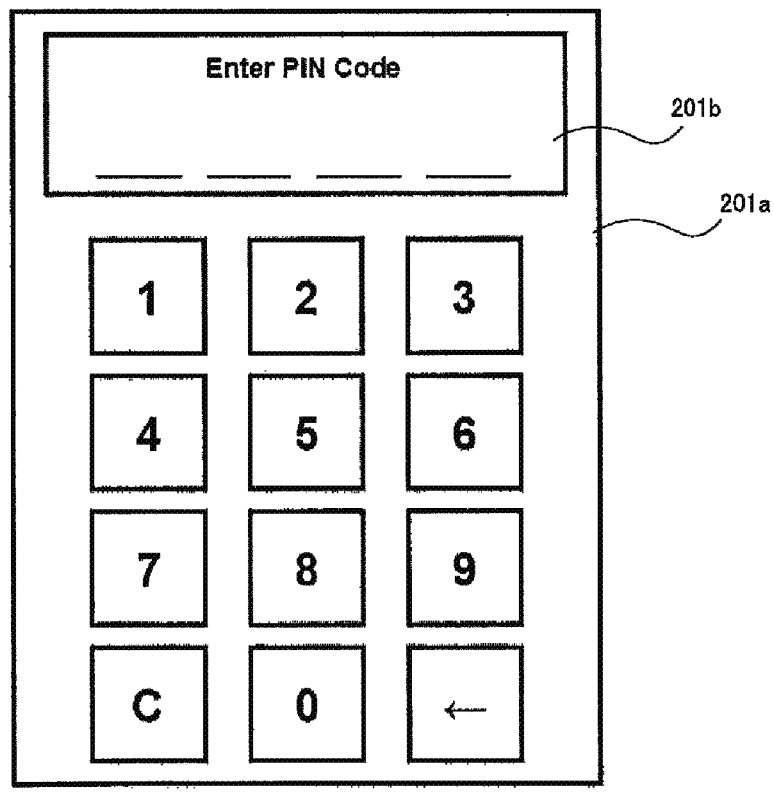

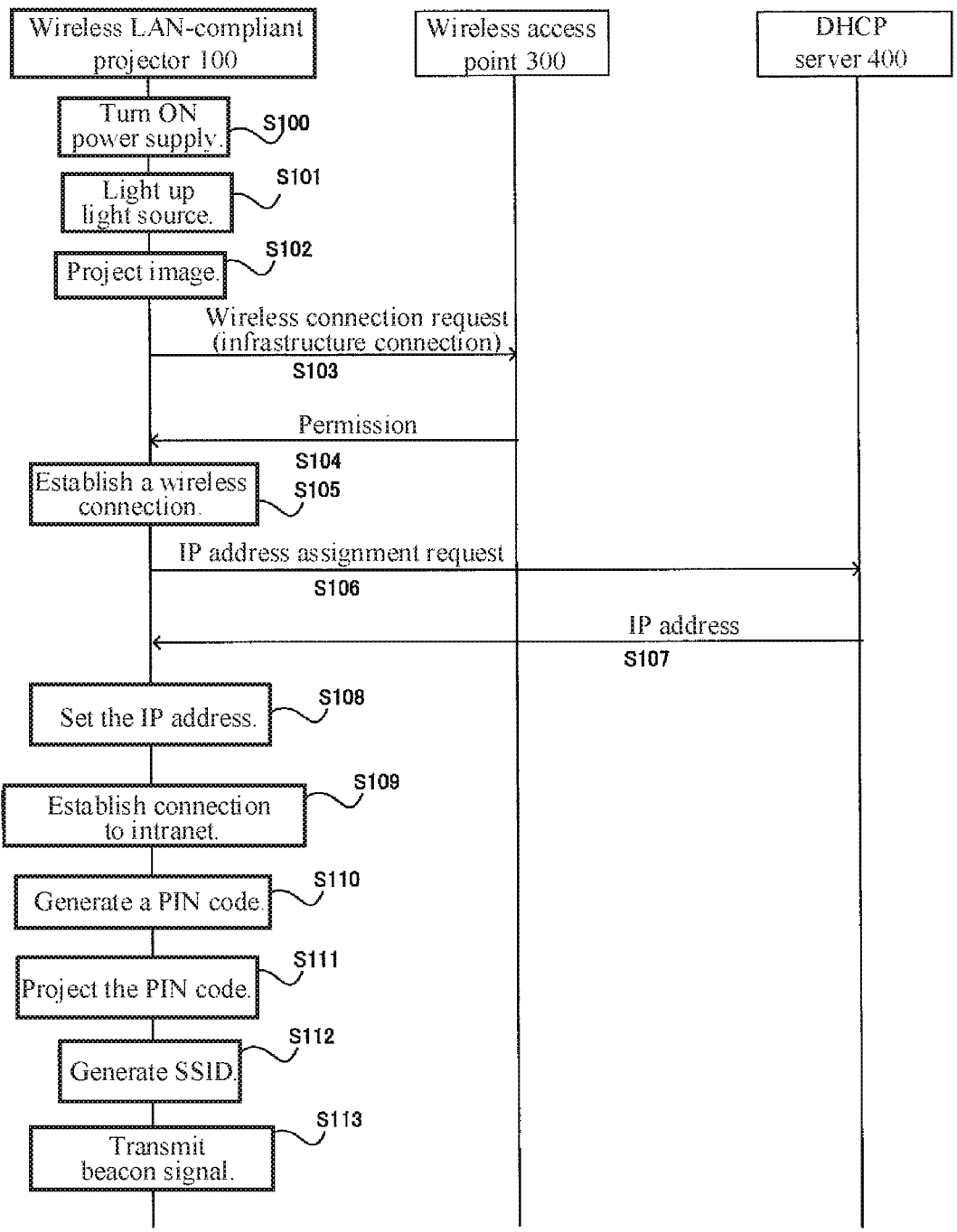

[Figure 6]
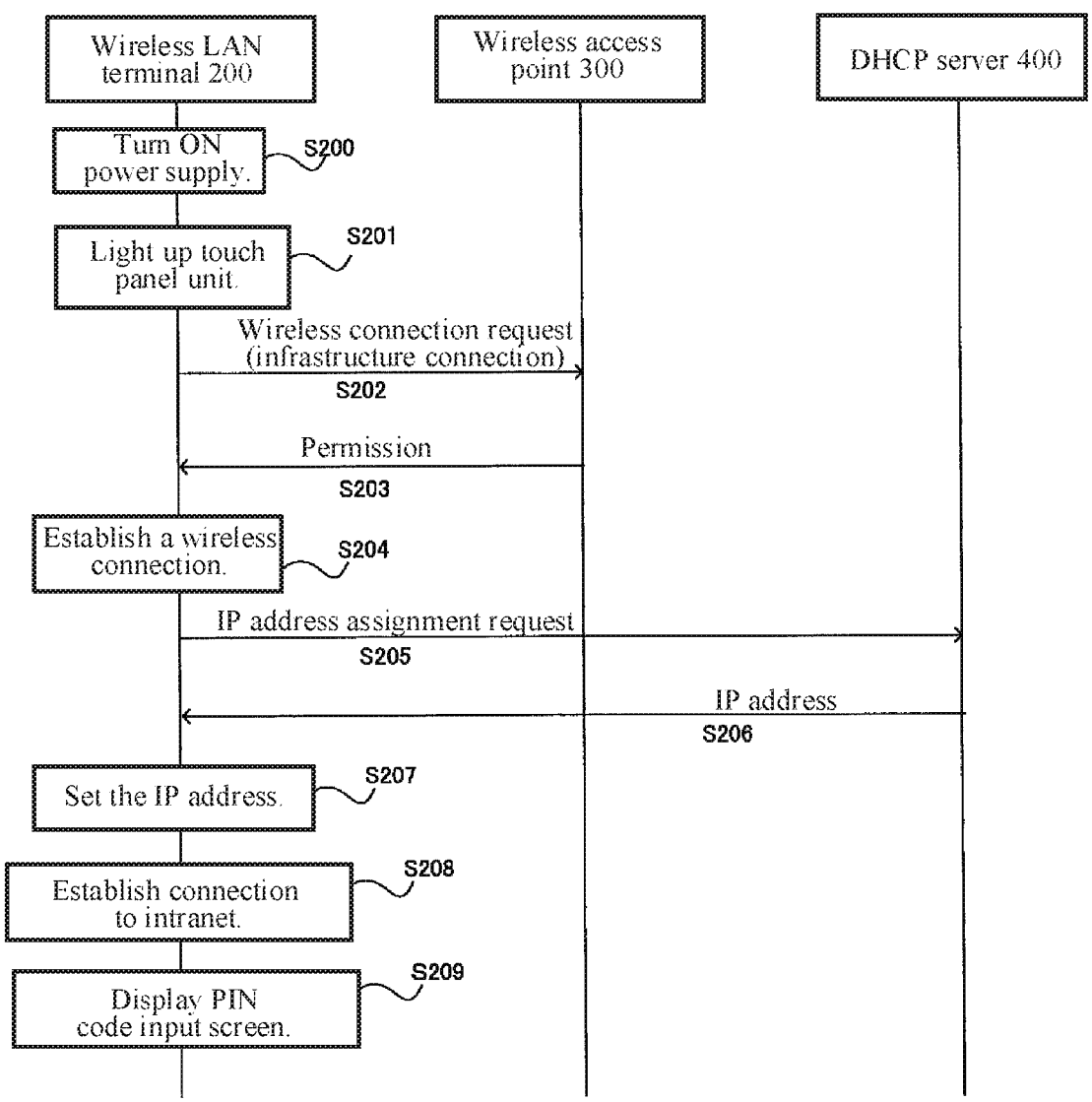

[Figure 7]
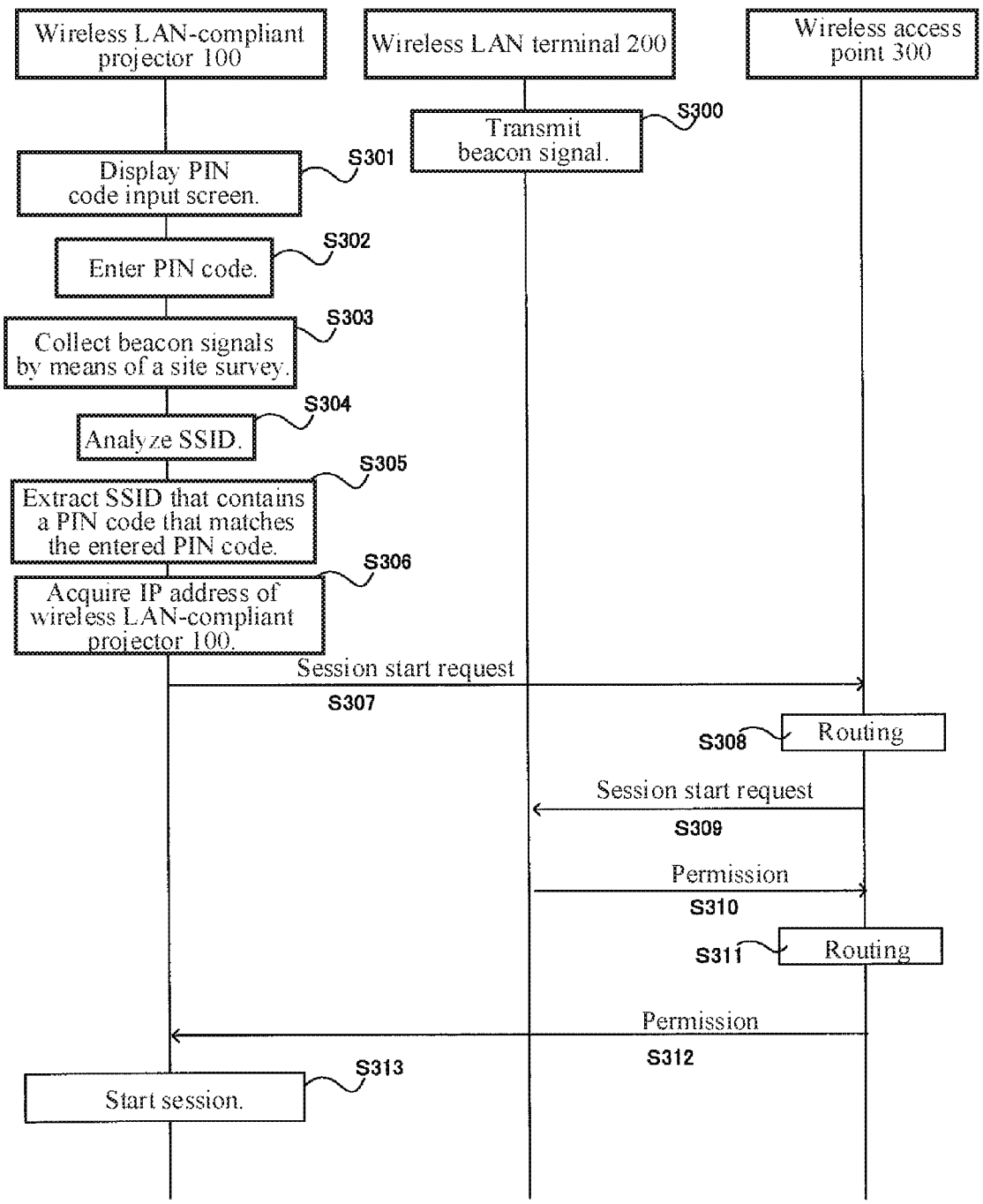

[Figure 8]
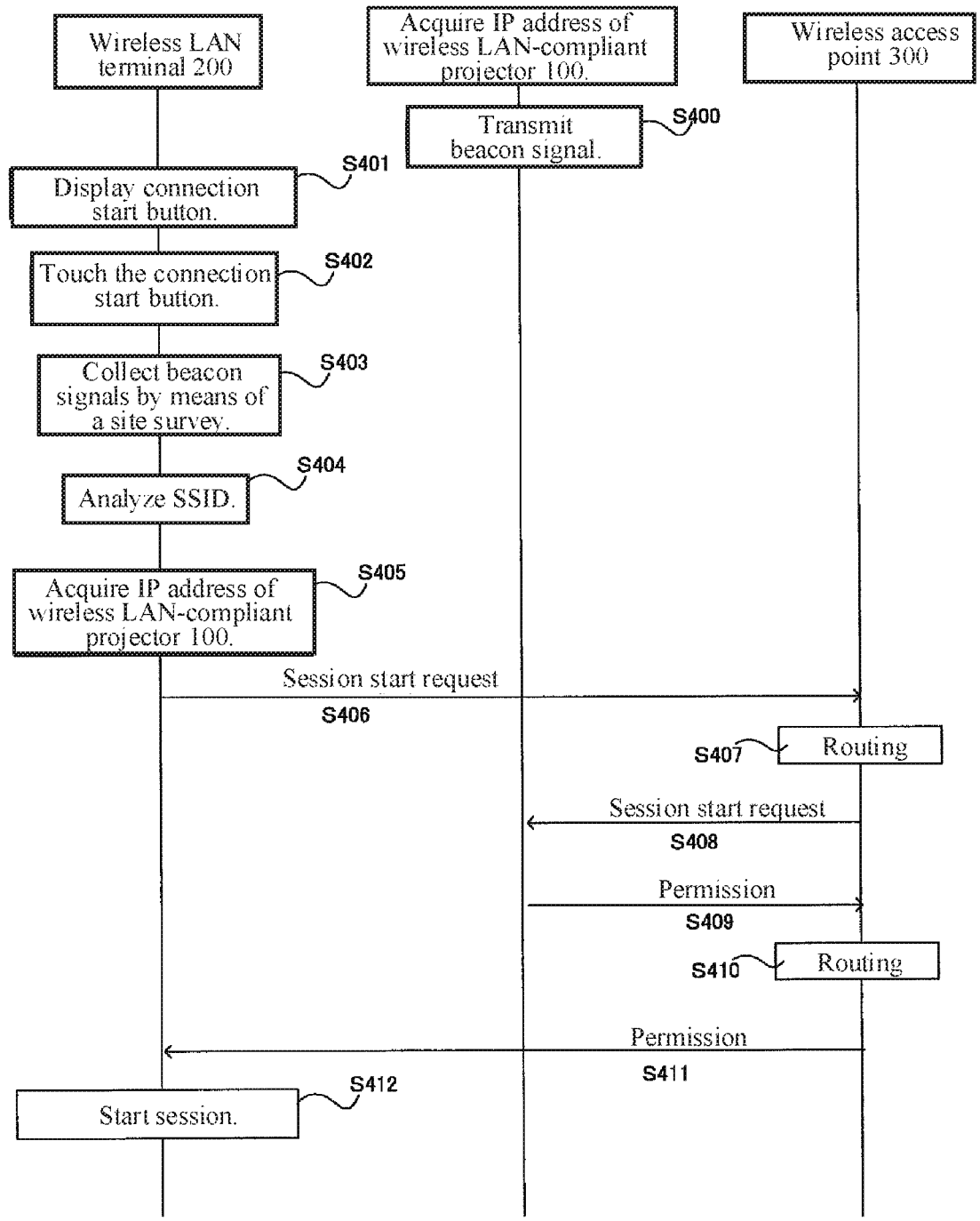

[Figure 9]
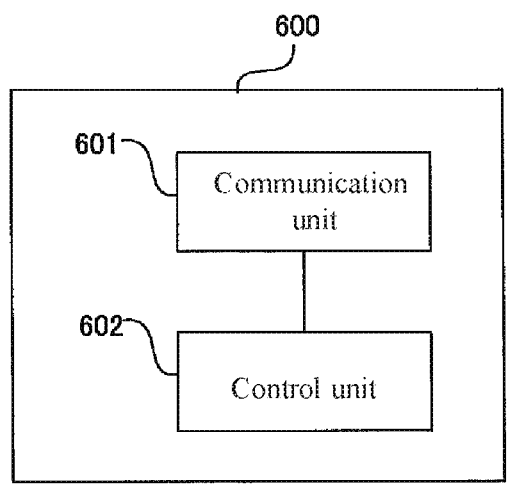
[Figure 10]
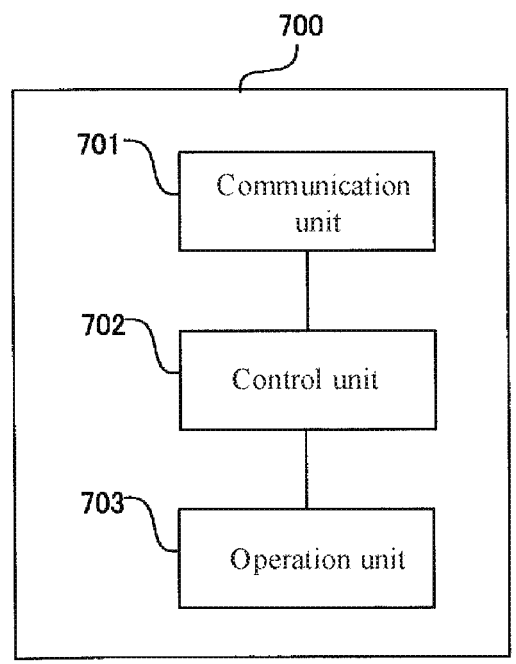

[Figure 11]
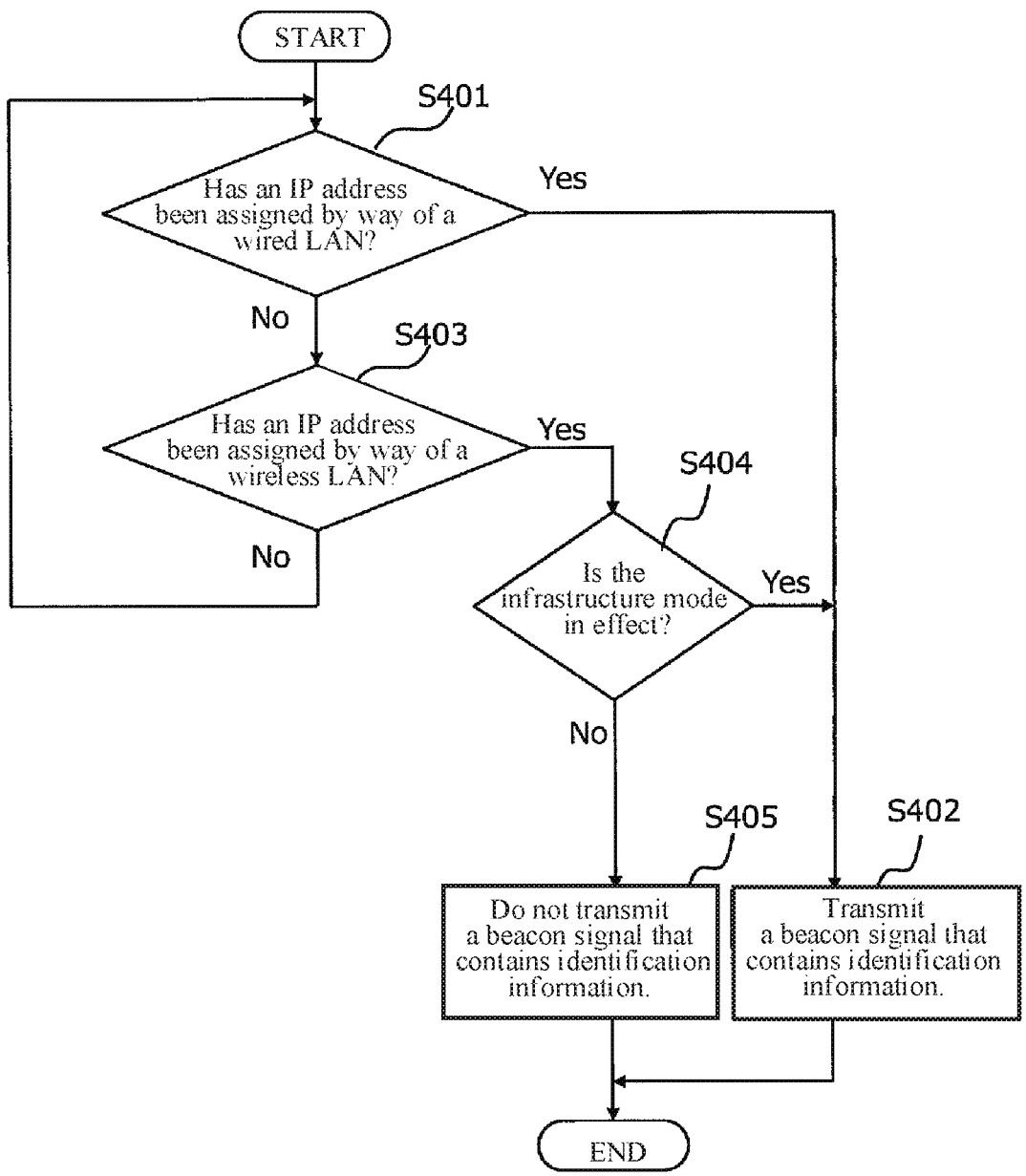

[Figure 12]
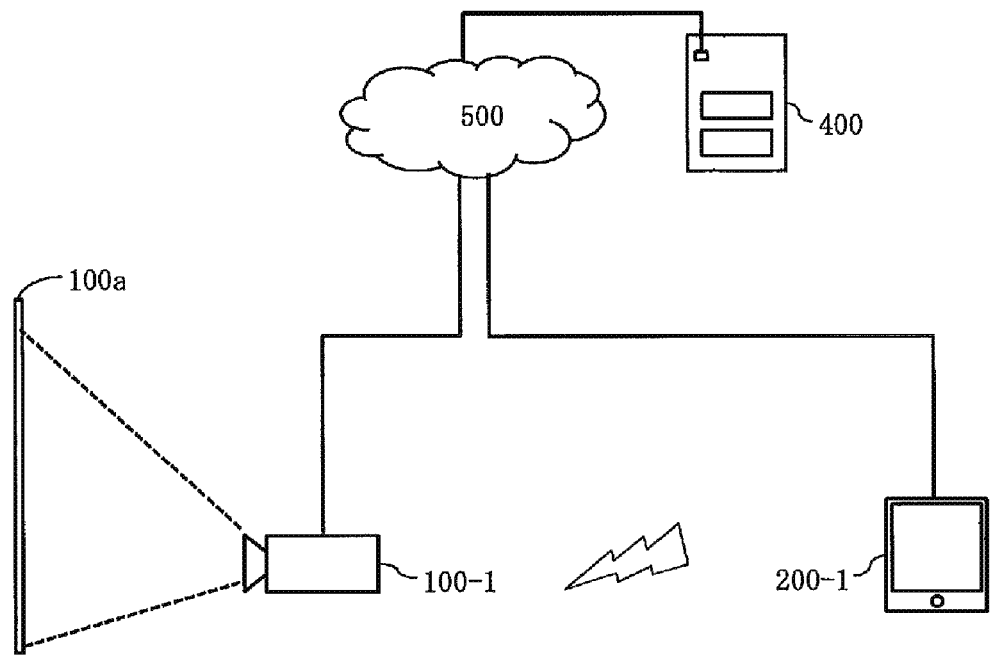
[Figure 13]
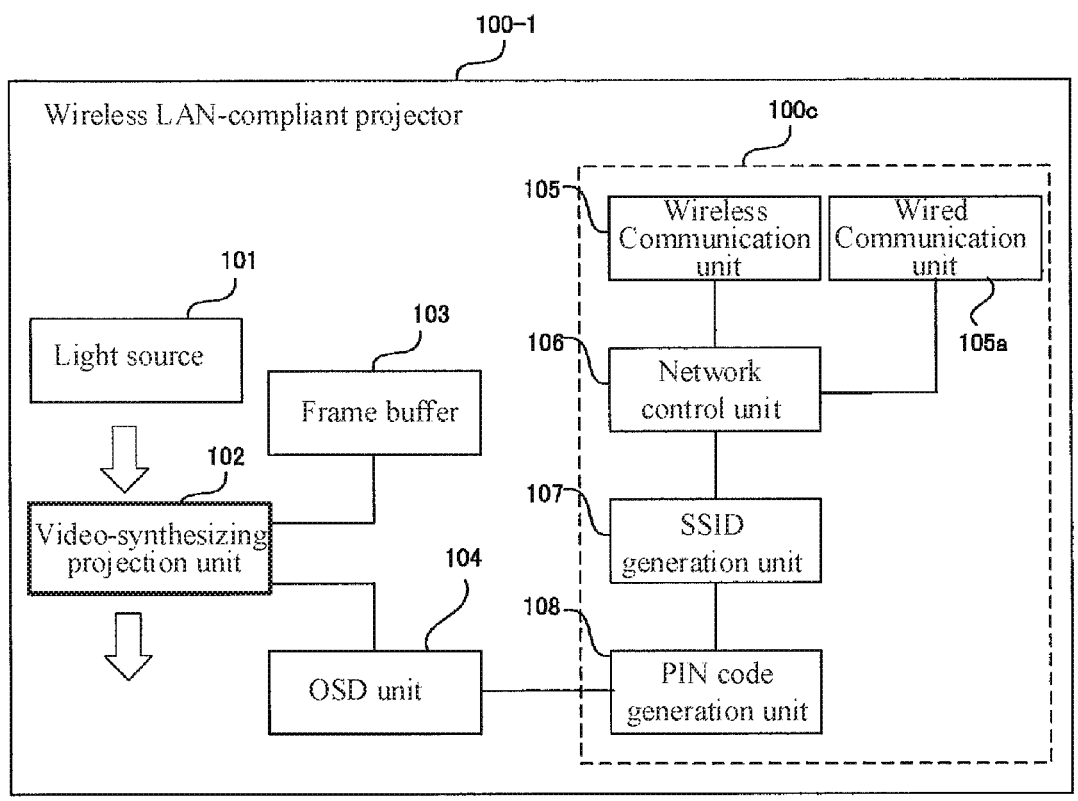

[Figure 14]
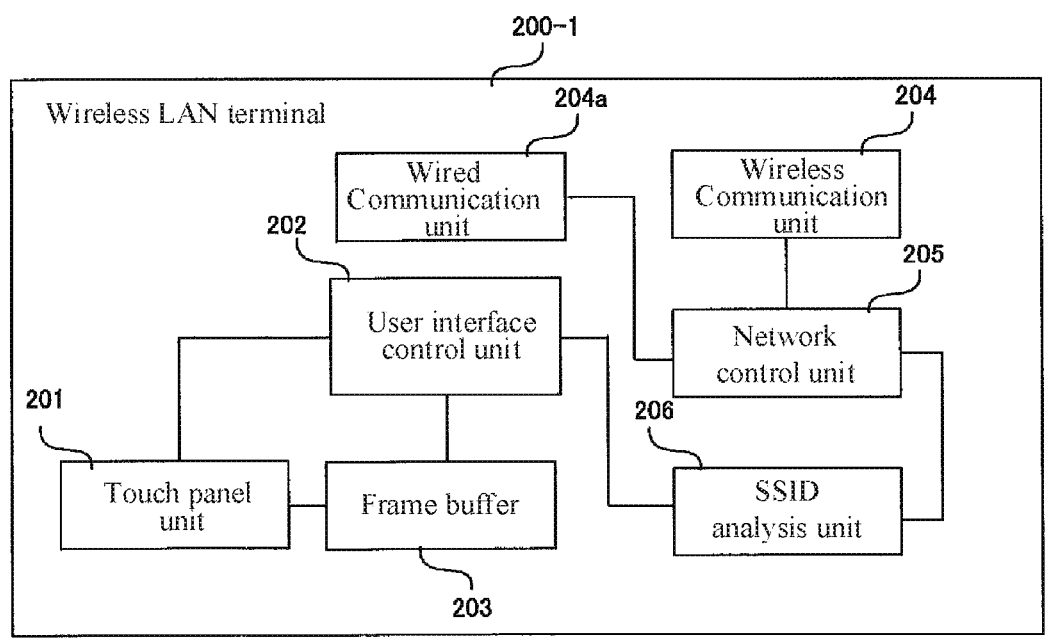

ELECTRONIC DEVICE, WIRELESS LAN TERMINAL, AND WIRELESS LAN SYSTEM

TECHNICAL FIELD

The present invention relates to an electronic device, a wireless LAN terminal, a wireless LAN system, a wireless LAN connection method, and a program.

BACKGROUND ART

Recent projectors include examples provided with a wireless LAN (Local Area Network) capability (hereinbelow referred to as "wireless LAN-compliant projectors"). These wireless LAN-compliant projectors can be used as wireless LAN terminals.

Wireless LAN connection forms typically include an ad hoc mode and an infrastructure mode. The ad hoc mode is a form in which wireless LAN terminals perform direct communication with each other. The infrastructure mode is a form in which the wireless LAN terminals communicate by way of wireless access points and do not communicate with each other directly.

In a wireless LAN system in which a wireless LAN-compliant projector communicates wirelessly with a wireless LAN terminal, the ad hoc mode and the infrastructure mode can both be applied.

In the ad hoc mode, the wireless LAN-compliant projector operates as a single wireless LAN terminal. The wireless LAN-compliant projector periodically broadcasts a beacon signal for reporting its own existence to the vicinity. The beacon signal includes an SSID (Service Set Identifier). This SSID includes information such as the identifier of the wireless LAN-compliant projector and a PIN (Personal Identification Number) code. The PIN code is made up of, for example, a four-digit number and is normally set using a random number.

The wireless LAN-compliant projector projects an image showing the PIN code, and the user enters the PIN code that was projected on a wireless LAN terminal that received the beacon signal. The wireless LAN terminal extracts the SSID from the beacon signals that were collected by means of the site survey and from among them acquires a SSID that contains the PIN code that the user entered. The wireless LAN terminal establishes a wireless connection with the wireless LAN-compliant projector on the basis of this SSID that was acquired.

In the infrastructure mode, on the other hand, a wireless LAN-compliant projector operates as a wireless LAN terminal and communicates with a wireless LAN terminal via a wireless access point. In this case, the user manually carries out on the wireless LAN terminal the required network connection settings to communicate with the wireless LAN-compliant projector via a wireless access point.

As related art, Patent Document 1 discloses a technology in a wireless LAN system that performs communication in the ad hoc mode in which the beacon signal is used to automatically perform connection settings.

LITERATURE OF THE PRIOR ART

Patent Documents

Patent Document 1: Japanese Unexamined Patent Application Publication No. 2011-188238

DISCLOSURE OF THE INVENTION

Problem to be Solved by the Invention

However, a wireless LAN system that performs communication in the above-described ad hoc mode or infrastructure mode entails the following problems.

In the ad hoc mode, the wireless LAN-compliant projector and wireless LAN terminal are completely isolated from a network such as the intranet, and the wireless LAN terminal is therefore unable to access a shared server on the network. As a result, when reference is desired to a file stored in a shared server, the user must first download the required file to the wireless LAN terminal from the shared server in advance. This task is extremely bothersome and inconvenient for the user.

In the infrastructure mode, a wireless LAN terminal is able to access a shared server on a network such as the intranet by way of a wireless access point. In this case, however, the user must manually perform the necessary network connection settings on the wireless LAN terminal in order to communicate with the wireless LAN-compliant projector via the wireless access point. This type of network connection setting is again extremely bothersome and inconvenient for the user.

It is an object of the present invention to provide an electronic device, a wireless LAN terminal, a wireless LAN system, a wireless LAN connection method, and a program that solve the above-described problems and that consequently enable superior convenience.

Means for Solving the Problem

In order to achieve the object described above, the electronic device of the present invention is an electronic device that is connected to a network by way of a wireless access point or a cable and that includes a communication unit provided with at least wireless communication capability and a control unit that controls the communication operation of the communication unit. The control unit, while connected to the network by way of the wireless access point or the cable, causes the communication unit to transmit a beacon signal that includes identification information of the electronic device. The identification information includes information of an IP address that can identify that electronic device on the network.

The first wireless LAN terminal of the present invention is a wireless LAN terminal that is connected to a network by way of a wireless access point or a cable and that includes an operation unit that accepts character input, a communication unit provided with at least a wireless communication capability, and a control unit that controls communication operations of the communication unit. The control unit receives the input of predetermined authentication information by way of the operation unit, and the communication unit, upon receiving from an electronic device that is connected to the network a wireless signal that contains the predetermined authentication information and information of the IP address of the electronic device not by way of either the wireless access point or the cable, causes the communication unit to transmit a session start request, in which the IP address is set as the destination address, by way of the wireless access point or the cable, and connects the communication unit to the network by way of the wireless access point or the cable before input of the predetermined authentication information or before reception of the wireless signal.

The second wireless LAN terminal of the present invention is a wireless LAN terminal that is connected to a network by way of a wireless access point or a cable and that includes a communication unit provided with at least a wireless communication capability and a control unit that controls operations of the communication unit. With the control unit connected to the network by way of the wireless access point or the cable, when the communication unit receives from the electronic device a signal that contains information of the IP address of the electronic device not by way of either the wireless access point or the cable, the control unit causes the communication unit to transmit a session start request, in which the IP address is set as the destination address, by way of the wireless access point or the cable.

The first wireless LAN system of the present invention has the above-described electronic device and any of the above-described wireless LAN terminals. The electronic device and the wireless LAN terminal communicate by way of a wireless access point.

The second wireless LAN system of the present invention has the above-described electronic device and a wireless access point. The electronic device and the wireless terminal communicate by way of the wireless access point.

The first wireless LAN connection method of the present invention is a wireless LAN connection method that is carried out in an electronic device that is connected to a network by way of a wireless access point or a cable and includes a step of transmitting a beacon signal that contains identification information of the electronic device while connected to a network by way of the wireless access point or the cable wherein the identification information includes information of the IP address that can identify the electronic device on the network.

The second wireless LAN connection method of the present invention is a wireless LAN connection method that is carried out in a wireless LAN terminal that is connected to a network by way of a wireless access point or a cable and includes: receiving input of predetermined authentication information and receiving, from an electronic device that is connected to the network, a wireless signal that contains the predetermined authentication information and information of an IP address of the electronic device not by way of either the wireless access point or the cable; transmitting, by way of the wireless access point or the cable, a session start request in which the IP address is set as the destination address; and connecting that wireless LAN terminal to the network by way of the wireless access point or the cable before input of the predetermined authentication information or before reception of the wireless signal.

The program of the present invention causes a computer of a wireless LAN terminal that is connected to a network by way of a wireless access point or a cable to execute processes of: accepting input of predetermined authentication information and receiving, from an electronic device that is connected to the network, a wireless signal that contains the predetermined authentication information and information of the IP address of the electronic device not by way of either the wireless access point or the cable; transmitting, by way of the wireless access point or the cable, a session start request in which the IP address is set as the destination address; and connecting the wireless LAN terminal to the network by way of the wireless access point or the cable before input of the predetermined authentication information or before reception of the wireless signal.

Effect of the Invention

The present invention can provide an electronic device, a wireless LAN terminal, a wireless LAN system, a wireless LAN connection method, and a program that offer superior convenience.

BRIEF DESCRIPTION OF THE DRAWINGS

FIG. 1 is a block diagram showing the configuration of a wireless LAN system that is an example embodiment of the present invention.

FIG. 2 is a block diagram showing the configuration of a wireless LAN-compliant projector that is an example embodiment of the present invention.

FIG. 3 is a block diagram showing the configuration of a wireless LAN terminal that is an example embodiment of the present invention.

FIG. 4 is a schematic view showing an example of a PIN code input screen.

FIG. 5 is a view for describing the procedures up to the process of PIN code connection standby that is carried out in the wireless LAN-compliant projector shown in FIG. 2.

FIG. 6 is a view for describing the procedures up to the process of PIN code connection standby that is carried out in the wireless LAN terminal shown in FIG. 3.

FIG. 7 is a view for describing the procedures of the PIN code connection operation.

FIG. 8 is a view for describing the procedures of the network connection operation that uses a connection start button.

FIG. 9 is a block diagram showing the configuration of an electronic device that is another example embodiment of the present invention.

FIG. 10 is a block diagram showing the configuration of a wireless LAN terminal that is another example embodiment of the present invention.

FIG. 11 is a flow chart showing the procedures of the process of determining whether to carry out transmission of a beacon signal that includes an IP address.

FIG. 12 is a block diagram showing the configuration of a wireless communication system that is another example embodiment of the present invention.

FIG. 13 is a block diagram showing the configuration of a wireless LAN-compliant projector of the wireless communication system shown in FIG. 12.

FIG. 14 is a block diagram showing the configuration of a wireless LAN terminal of the wireless communication system shown in FIG. 12.

EXAMPLE EMBODIMENTS

Example embodiments of the present invention are next described with reference to the accompanying drawings.

FIG. 1 is a block diagram showing the configuration of a wireless LAN system that is an example embodiment of the present invention.

Referring to FIG. 1, the wireless LAN system includes wireless LAN-compliant projector 100, wireless LAN terminal 200, wireless access points 300, DHCP (Dynamic Host Configuration Protocol) server 400, and intranet 500. Wireless LAN-compliant projector 100 can also be referred to as an "electronic device."

Wireless access points 300, DHCP server 400, and intranet 500 can be realized by applying existing components. The configurations of these wireless access points 300, DHCP server 400, and intranet 500 are known, and detailed explanation of their configurations are therefore here omitted. In FIG. 1, two wireless access points 300 are shown, but the present invention is not limited to this number. The number of wireless access points 300 is one or more. In addition, another server (for example, a shared server) may be arranged on intranet 500, and intranet 500 may be connected to another network by way of a relay device such as a gateway.

The configuration of wireless LAN-compliant projector 100 will first be described in concrete terms.

Wireless LAN-compliant projector 100 projects an image on screen 100a. Wireless LAN-compliant projector 100 is provided with a wireless LAN capability and is capable of wireless communication with wireless access points 300 and transmission of a beacon signal.

FIG. 2 shows the configuration of wireless LAN-compliant projector 100. Referring to FIG. 2, wireless LAN-compliant projector 100 includes light source 101, video-synthesizing projection unit 102, frame buffer 103, OSD (On-Screen Display) unit 104, and wireless LAN unit 100b. Although not shown in FIG. 2, wireless LAN-compliant projector 100 is also provided with an operation unit that accepts input operations of a user. The user is able perform various operations such as activation of the projector (or the activation of wireless LAN unit 100b), switching of operating modes, menu display, and item selection.

Video-synthesizing projection unit 102 is electrically connected to frame buffer 103 and OSD unit 104. OSD unit 104 is electrically connected to wireless LAN unit 100b.

A solid-state light source such as an LED (Light Emitting Diode) or a laser light source, a light source in which a phosphor and a solid-state light source are combined, and a high-pressure mercury lamp can be used as light source 101. The light emitted from light source 101 is supplied to video-synthesizing projection unit 102.

Frame buffer 103 temporarily holds image data in frame units. For example, a video signal that is supplied from a video output device is supplied to video-synthesizing projection unit 102 by way of frame buffer 103. The video output device is, for example, a personal computer, an HDD (Hard Disk Drive) player, or a DVD (Digital Versatile Disk) player.

OSD unit 104 supplies a video signal that shows an onscreen menu screen to video-synthesizing projection unit 102. The onscreen menu screen can display screens such as an image quality adjustment menu, an operating mode setting menu, a wireless LAN menu, and a PIN code screen.

The wireless LAN menu includes selection items such as "disabled," "ad hoc," and "infrastructure." When "disabled" is selected, wireless LAN unit 100b suspends operation. When "ad hoc" is selected, wireless LAN unit 100b operates as a single wireless LAN terminal and is able to transmit a beacon signal. When "infrastructure" is selected, wireless LAN unit 100b operates as a wireless LAN terminal and is able to collect beacon signal by means of a site survey and to transmit a beacon signal that contains at least its own IP address.

Video-synthesizing projection unit 102 includes a video-processing unit, an image-forming element, and a projection lens. In the video-processing unit, a video signal from frame buffer 103 is applied as a first video signal and a video signal from OSD unit 104 is applied as a second video signal. Normally, only the first video signal is supplied to the video-processing unit, and the video-processing unit supplies a video signal that indicates an image based on the first video signal to the image-forming element. When the user performs an input operation for displaying a menu, the first and second video signals are supplied to the video-processing unit, and the video-processing unit supplies to the image-forming element a video signal that indicates a synthesized image in which an image based on the first video signal and an image based on the second video signal are synthesized.

The image-forming element is a display element such as a liquid crystal display device or a DMD (Digital Micromirror Device) Luminous flux from light source 101 is irradiated upon the image-forming element. The image-forming element forms images by spatially and/or temporally modulating the luminous flux on the basis of the input video signal from the video-processing unit. The projection lens enlarges and projects an image that is formed in the image-forming element upon screen 100a. Screen 100a may be a dedicated screen or may be a structural body such as a wall.

Wireless LAN unit 100b includes wireless communication unit 105, network control unit 106, SSID generation unit 107, and PIN code generation unit 108. Network control unit 106 is electrically connected to wireless communication unit 105, and moreover, is electrically connected to SSID generation unit 107. SSID generation unit 107 is electrically connected to PIN code generation unit 108. PIN code generation unit 108 is electrically connected to OSD unit 104.

Wireless communication unit 105 communicates wirelessly with wireless access point and wirelessly broadcasts a beacon signal.

Network control unit 106 is a controller that performs communication control of the Internet protocol (IP) and manages IP addresses. Network control unit 106 holds IP addresses that are the information for identifying wireless LAN-compliant projector 100 on intranet 500. The IP address of wireless LAN-compliant projector 100 in this case is assigned by DHCP server 400. In addition, network control unit 106 also controls the communication operations of wireless communication unit 105. Network control unit 106 is typically referred to as a control unit.

PIN code generation unit 108 generates PIN codes that are composed of numbers of a plurality of digits. For example, PIN code generation unit 108 uses random numbers to generate PIN codes that are made up of numbers of four digits.

SSID generation unit 107 generates SSID that includes the PIN code that was generated by PIN code generation unit 108 and the IP address of wireless LAN-compliant projector 100. SSID may also include other information that is necessary for wireless communication with wireless access points 300 or for connecting to a network. For example, SSID is given by the naming rules of "prefix"+"IP address"+"PIN code" and uses "_" as a delimiter. More specifically, SSID can be described by "MPJ_192.168.010.011_9086". Wireless communication unit 105 transmits a beacon signal that includes this SSID. SSID can typically be referred to as identification information, and SSID generation unit 107 can be referred to as an identification information generation unit.

Wireless LAN unit 100b may be incorporated in wireless LAN-compliant projector 100 or may be configured to be detachable from the case of wireless LAN-compliant projector 100. Detachable wireless LAN unit 100b may, for example, be a USB-type unit that is inserted into a USB (Universal Serial Bus) port and performs operation wirelessly via a LAN.

The configuration of wireless LAN terminal 200 is next described in concrete terms.

FIG. 3 shows the configuration of wireless LAN terminal 200. Referring to FIG. 3, wireless LAN terminal 200 includes touch panel unit 201, user interface control unit 202, frame buffer 203, wireless communication unit 204, network control unit 205, and SSID analysis unit 206.

User interface control unit 202 is electrically connected to each of touch panel unit 201, frame buffer 203, and SSID analysis unit 206. Touch panel unit 201 is electrically connected to frame buffer 203. Network control unit 205 is electrically connected to each of wireless communication unit 204 and SSID analysis unit 206.

Frame buffer 203 temporarily holds image data. For example, image data for indicating a PIN code input screen are held in frame buffer 203.

Touch panel unit 201 is made up of a display device such as a liquid crystal panel and a position input device such as a touch pad. The display device is able to display images based on image data that are stored in frame buffer 203, and the position input device accepts touch operations to the display screen. The user is able to enter necessary information and select items by performing touch operations to the display screen. Touch panel unit 201 can typically be referred to as an operation unit.

FIG. 4 shows an example of a PIN code input screen that is displayed on touch panel unit 201. This PIN code input screen 201a includes number keys from 0-9, a "C" key, an arrow key, and a display region 201b in which a four-digit number that has been entered is displayed. The user is able to enter any four-digit number by touching number keys. The "C" key is a clear key for collectively clearing numbers that have been entered. Display region 201b is provided with four display spaces corresponding to each of the ones place, the tens place, the hundreds, place, and the thousands place, and a cursor is displayed at the display space that is currently awaiting input. The arrow key moves the cursor back by one character and deletes that character, and thus can be referred to as a backspace key.

User interface control unit 202 accepts input operations of the user by way of touch panel unit 201, and in accordance with these input operations, performs tasks such as compiling image data that are held in frame buffer 203 and supplying input information to SSID analysis unit 206. For example, user interface control unit 202 supplies SSID analysis unit 206 with input information that indicates a four-digit number entered on the PIN code input screen by the user.

Wireless communication unit 204 performs such tasks as communicating wirelessly with wireless access points 300 and collecting beacon signals by means of site surveys.

Network control unit 205 is a controller that performs communication control of Internet protocol and manages IP addresses. Network control unit 205 holds IP addresses that are information for identifying wireless LAN terminal 200 on intranet 500. The IP address of wireless LAN terminal 200 in this case is assigned in DHCP server 400.

In addition, network control unit 205 controls the communication operations of wireless communication unit 204. When wireless communication unit 204 receives a beacon signal, network control unit 205 supplies the SSID that is contained in this beacon signal to SSID analysis unit 206.

Network control unit 205 further causes wireless communication unit 204 to transmit a session start request, in which the IP address of wireless LAN-compliant projector 100 that is supplied from SSID analysis unit 206 is set as the destination address and the IP address of wireless LAN terminal 200 is set as the transmission-origin address, to wireless access point 300. In the session start request. Network control unit 205 can typically be referred to as a control unit.

SSID analysis unit 206 analyzes the SSID of beacon signals that have been collected by wireless communication unit 204 by means of a site survey and extracts the SSID that includes a PIN code (4-digit number) that was entered by the user. SSID analysis unit 206 removes the IP address from the extracted SSID and supplies this IP address to network control unit 205. The SSID that includes the PIN code that was entered by a user is the SSID that was included in the beacon signal received from wireless LAN-compliant projector 100. As a result, SSID analysis unit 206 is able to acquire the IP address of a wireless LAN-compliant projector from an SSID.

In the wireless LAN system of the present example embodiment described above, wireless LAN-compliant projector 100 and wireless LAN terminal 200 are each connected to intranet 500 by way of wireless access points 300. Wireless LAN terminal 200 and wireless LAN-compliant projector 100 are then connected via wireless access points 300 using the PIN code.

The operation of each of wireless LAN-compliant projector 100 and wireless LAN terminal 200 is next described in detail.

The operation up to the PIN code connection standby of wireless LAN-compliant projector 100 is first described in concrete terms.

FIG. 5 shows the processes up to the PIN code connection standby of wireless LAN-compliant projector 100. Here, "infrastructure" is selected in advance in a wireless LAN menu.

The user turns ON the power supply of wireless LAN-compliant projector 100 (Step S100). In wireless LAN-compliant projector 100, light source 101 lights up (Step S101), video-synthesizing projection unit 102 projects an image on screen 100a (Step S102).

Network control unit 106 next causes wireless communication unit 105 to transmit a wireless connection request (infrastructure connection) to wireless access points 300 (Step S103). For example, wireless access points 300 periodically transmit a beacon signal that contains an SSID, and in wireless LAN-compliant projector 100, the SSID is extracted from this beacon signal and transmission of the wireless connection request is carried out on the basis of this SSID.

Wireless access points 300 receive the wireless connection request from wireless LAN-compliant projector 100 and transmit a response signal that indicates permission to wireless LAN-compliant projector 100 (Step S104), whereby wireless communication is established between wireless LAN-compliant projector 100 and wireless access points 300 (Step S105).

Network control unit 106 next transmits an IP address assignment request from wireless communication unit 105 to DHCP server 400 by way of wireless access points 300 (Step S106). DHCP server 400 receives the IP address assignment request from wireless LAN-compliant projector 100 and transmits response signal that contains an IP address (for example, "192.168.010.011") to wireless LAN-compliant projector 100 by way of wireless access points 300 (Step S107).

In wireless LAN-compliant projector 100, wireless communication unit 105 receives the response signal from DHCP server 400, and network control unit 106 holds the IP address that is contained in the response signal that was received (Step S108). Network control unit 106 establishes a connection to intranet 500 by way of wireless access point 300 on the basis of the IP address (Step S109).

PIN code generation unit 108 generates a PIN code (for example, "9086") (Step S110). OSD unit 104 then supplies image data that indicates the PIN code to video-synthesizing projection unit 102, and video-synthesizing projection unit 102 projects an image that indicates the PIN code (for example, an image of "9086") upon screen 100a (Step S111). In this way, a user is able to visually recognize the PIN code (for example, "9086").

SSID generation unit 107 next generates an SSID that includes a PIN code and an IP address, and network control unit 106 causes a beacon signal that contains this SSID to be periodically transmitted from wireless communication unit 105. The SSID is, for example, "MPJ_192.168.010.011_9086". The transmission period of the beacon signal is, for example, 100 milliseconds.

The foregoing explanation is the operation up to the PIN code connection standby of wireless LAN-compliant projector 100.

The operation up to the PIN code connection standby of wireless LAN terminal 200 is next described in concrete terms.

FIG. 6 shows the processes up to the PIN code connection standby of wireless LAN terminal 200.

The user turns ON the power source of wireless LAN terminal 200 (Step S200). In wireless LAN terminal 200, touch panel unit 201 lights up (Step S201).

Network control unit 205 next causes a wireless connection request (infrastructure connection) to be transmitted from wireless communication unit 204 to wireless access points 300 (Step S202). For example, wireless access points 300 periodically transmit a beacon signal that contains SSID, and in wireless LAN terminal 200, the SSID is extracted from the beacon signal and the wireless connection request is transmitted on the basis of this SSID.

Wireless access points 300 receive the wireless connection request from wireless LAN terminal 200 and transmit to wireless LAN terminal 200 a response signal that indicates permission (Step S203), whereby wireless communication is established between wireless LAN terminal 200 and wireless access points 300 (Step S204).

Network control unit 205 next transmits an IP address assignment request from wireless communication unit 204 to DHCP server 400 by way of wireless access point 300 (Step S205). DHCP server 400 receives the IP address assignment request from wireless LAN terminal 200 and transmits a response signal that contains an IP address (for example, "192. 168. 010. 012") to wireless LAN terminal 200 by way of wireless access point 300.

In Wireless LAN terminal 200, wireless communication unit 204 receives the response signal from DHCP server 400, and network control unit 205 holds the IP address that is contained in the response signal that was received (Step S207). In this way, a connection to intranet 500 of wireless LAN terminal 200 is established (Step S208).

User interface control unit 202 next causes the PIN code input screen to be displayed on touch panel unit 201 (Step S209).

The foregoing steps are the operations up to the PIN code connection standby of wireless LAN terminal 200.

Explanation next regards the PIN code connection operation in which a PIN code is used to connect wireless LAN terminal 200 to wireless LAN-compliant projector 100 by way of wireless access points 300.

FIG. 7 shows the procedures of the PIN code connection operation. Here, wireless LAN-compliant projector 100 and wireless LAN terminal 200 are each in a state in which the procedures shown in FIGS. 5 and 6 have been executed.

Wireless communication unit 105 of wireless LAN-compliant projector 100 periodically transmits a beacon signal that contains an SSID (for example, "MPJ_192.168.010.011_9086") (Step S300).

In wireless LAN terminal 200, touch panel unit 201 displays a PIN code input screen such as shown in FIG. 4 (Step S301). The user visually recognizes the PIN code (for example, "9086") that wireless LAN-compliant projector 100 projects on screen 100a and enters the PIN code on the PIN code input screen (Step S302).

Wireless communication unit 204 next collects beacon signals by means of a site survey (Step S303). SSID analysis unit 206 analyzes the SSID of the beacon signals that wireless communication unit 204 has collected by the site survey (Step S304), and extracts the SSID (for example, "MPJ_192.168.010.011_9086") that includes the PIN code that was entered by the user (Step S305). SSID analysis unit 206 then removes the IP address (for example, "192.168.010.011") from the extracted SSID and supplies this IP address to network control unit 205 (Step S306).

Network control unit 205 next causes wireless communication unit 204 to transmit a session start request to wireless access points 300 (Step S307). Here, in the session start request, an IP address (for example, "192.168.010.011") of wireless LAN-compliant projector 100 is set as the destination address and the IP address (for example, "192.168.010.012") of the wireless LAN terminal 200 is set as the transmission-origin address.

Wireless access points 300 accept the session start request from wireless LAN terminal 200 and carry out routing on the basis of the destination address of the request (Step S308) to send this session start request to wireless LAN-compliant projector 100 (Step S309).

In wireless LAN-compliant projector 100, wireless communication unit 105 next receives the session start request from wireless access point 300. Network control unit 106 then causes a response signal that indicates permission from wireless communication unit 105 to wireless access points 300 in accordance with the session start request (Step S310). This response signal sets the IP address (for example, "192.168.010.012") of wireless LAN terminal 200 to the destination address and sets the IP address (for example, "192.168.010.011") of wireless LAN-compliant projector 100 to the transmission-origin address.

Wireless access points 300 receive the response signal from wireless LAN-compliant projector 100 and carry out routing on the basis of the destination address of the response signal (Step S311) to send the response signal to wireless LAN terminal 200 (Step S312).

In wireless LAN terminal 200, network control unit 205 receives the response signal from wireless access points 300 by way of wireless communication unit 204, whereby a session is started between wireless LAN terminal 200 and wireless LAN-compliant projector 100 by way of wireless access points 300 (Step S313).

The wireless LAN system of the present example embodiment described above exhibits the following action and effects.

A wireless LAN-compliant projector typically has the two items of "ad hoc" and "infrastructure" as the selection items of wireless LAN connection modes. When connecting a user's wireless LAN terminal (for example, a notebook personal computer) to a wireless LAN-compliant projector, the user selects either "ad hoc" or "infrastructure."

When "ad hoc" is selected, the wireless LAN-compliant projector operates as a single wireless LAN terminal and broadcasts a beacon signal that includes an SSID to wireless LAN terminals within the wireless communication area. In this case, a network in which the wireless LAN-compliant projector and the wireless LAN terminal communicate directly, i.e., a network having the ad-hoc-mode connection form, is constructed. This network is not linked with an intranet and a wireless LAN terminal is therefore unable to access a shared server on the intranet.

On the other hand, when "infrastructure" is selected, the wireless LAN-compliant projector operates as a wireless LAN terminal and collects beacon signals from wireless access points by means of a site survey without performing transmission of a beacon signal. The wireless LAN-compliant projector establishes a wireless connection with the optimum wireless access point on the basis of the SSID that is contained in the beacon signals, and moreover, establishes a network connection to the intranet. The user connects a wireless LAN terminal with the wireless LAN-compliant projector by way of wireless access points. In this case, the user is able to access a shared server on the intranet from the wireless LAN terminal. However, the user must manually perform the network connection settings on the wireless LAN terminal in order to connect to the wireless LAN-compliant projector by way of wireless access points.

In the present example embodiment, in contrast, when "infrastructure" is selected, wireless LAN-compliant projector 100 operates as a wireless LAN terminal but broadcasts a beacon signal that contains its own IP address. Wireless LAN terminal 200 is able to acquire the IP address of wireless LAN-compliant projector 100 by receiving this beacon signal and is able to use this IP address to establish a network connection with wireless LAN-compliant projector 100 by way of wireless access points 300. In this case, the user does not need to manually perform network connection settings. In addition, the user is able to access a shared server on intranet 500 from wireless LAN terminal 200.

Thus, the present example embodiment allows wireless LAN terminal 200 to automatically connect to wireless LAN-compliant projector 100 by way of wireless access points 300, and moreover, enables access to a shared server from wireless LAN terminal 200, and therefore realizes an improvement in convenience.

In addition, wireless LAN terminal 200 collects beacon signals by means of a site survey and therefore may collect not only beacon signals from wireless LAN-compliant projector 100 but also beacon signals from other devices. In this case, other devices are wireless access points 300 or other wireless LAN-compliant projectors. In this case, a wireless LAN terminal normally displays a list of network names that can connect on the basis of the SSIDs that were acquired from each of the beacon signals, and the user selects the network name that corresponds to wireless LAN-compliant projector 100 from this list. In the present example embodiment, the PIN codes are used to determine the network that is to be connected, and this operation of selecting the network is therefore unnecessary.

To explain in more concrete terms, wireless LAN-compliant projector 100 both transmits a beacon signal that contains an SSID that notes an IP address and a PIN code and projects an image showing the PIN code. The user is able to acquire the PIN code that is being used in wireless LAN-compliant projector 100 from the projected image. Wireless LAN terminal 200 carries out network connection settings on the basis of the beacon signal which matches the PIN code that was entered on the PIN code input screen. In this way, the user is able to connect wireless LAN terminal 200 to wireless LAN-compliant projector 100 by way of wireless access point 300 by merely entering the PIN code on the wireless LAN terminal 200 and without performing the operation of selecting a network name or carrying out the network connection settings. A further improvement in convenience is thus realized.

In addition, in the wireless LAN system of the present example embodiment, instead of realizing network connection by means of PIN code input, a connection start button can also be displayed on wireless LAN terminal 200 and the user can perform network connection by pressing the connection start button.

FIG. 8 shows the operation procedures of network connection using a connection start button.

Wireless communication unit 105 of wireless LAN-compliant projector 100 periodically transmits a beacon signal that includes an SSID (for example, "MPJ_192.168.010.011_9086") (Step S400).

In wireless LAN terminal 200, touch panel unit 201 displays the connection start button (Step S401). The user touches the connection start button (Step S402), whereupon wireless communication unit 204 collects beacon signals by means of a site survey (Step S403). SSID analysis unit 206 analyzes the SSIDs of beacon signals that are collected by the site survey (Step S404) and extracts SSID that contain connectible IP addresses. For example, SSID analysis unit 206 determines that the SSID of the beacon signal having the highest signal strength is transmitted from wireless LAN-compliant projector 100.

SSID analysis unit 206 next removes the IP address (for example, "192.168.010.011") from the extracted SSID and supplies this IP address to network control unit 205 (Step S405). Network control unit 205 then causes a session start request to be transmitted to wireless access points 300 from wireless communication unit 204 (Step S406). Here, the session start request sets the IP address (for example, "192.168.010.011") of wireless LAN-compliant projector 100 to the destination address and sets the IP address (for example, "192.168.010.012") of wireless LAN terminal 200 to the transmission-origin address.

Wireless access point 300 receives the session start request from wireless LAN terminal 200 and carry out routing on the basis of the destination address of the request (Step S407) to send the session start request to wireless LAN-compliant projector 100 (Step S408).

In wireless LAN-compliant projector 100, wireless communication unit 105 next receives the session start request from wireless access point 300. Network control unit 106 then causes a response signal indicating permission to be transmitted from wireless communication unit 105 to wireless access points 300 in accordance with the session start request (Step S409). This response signal is a signal in which the IP address (for example, "192.168.010.012") of wireless LAN terminal 200 is set as the destination address and the IP address (for example, "192.168.010.011") of wireless LAN-compliant projector 100 is set as the transmission-origin address.

Wireless access points 300 receive the response signal from wireless LAN-compliant projector 100 and carry out routing on the basis of the destination address of the response signal (Step S410) to send the response signal to wireless LAN terminal 200 (Step S411).

In wireless LAN terminal 200, network control unit 205 receives the response signal from wireless access point 300 by way of wireless communication unit 204, whereby a session is started between wireless LAN terminal 200 and wireless LAN-compliant projector 100 by way of access points 300 (Step S412).

In the network connection that uses the above-described connection start button, wireless LAN terminal 200 can be automatically connected to wireless LAN-compliant projector 100 by way of wireless access points 300, and moreover, a shared server can be accessed from wireless LAN terminal 200. As a result, an improvement in convenience is realized.

The processing up to the PIN code connection standby shown in FIG. 5 and the PIN code connection process of wireless LAN-compliant projector 100 of the PIN connection operation shown in FIG. 7 may be realized by the execution of a program by a computer. In this case, the program may cause a computer of wireless LAN-compliant projector 100 to execute the processing up to PIN code connection standby and the PIN code connection process.

Similarly, of the network connection operations that use the connection start button shown in FIG. 8, the network connection process of wireless LAN-compliant projector 100 may be realized by the execution of a program by a computer. In this case, the program may cause a computer of wireless LAN-compliant projector 100 to execute the network connection process.

In addition, of the processes up to the PIN code connection standby of wireless LAN terminal 200 shown in FIG. 7 and the PIN code connection process of wireless LAN terminal 200 of the PIN code connection operations shown in FIG. 8 may be realized by the execution of a program by a computer. For example, the program may cause the computer of wireless LAN terminal 200 to execute the process up to the PIN code connection standby and the PIN code connection process.

The above-described program may be provided by a medium (also referred to as a recording medium) that can be used by a computer or can be read by a computer or may be provided by way of a network such as the Internet. Here, a medium that can be used by a computer or that can be read by a computer includes a medium that allows recording or reading of information through the use of magnetism, light, electrons, electromagnetism, or infrared rays. Examples of such a medium include, for example, a semiconductor memory, semiconductor or solid-state storage devices, magnetic tape, detachable computer diskettes, Random Access Memory (RAM), Read Only Memory (ROM), magnetic disks, optical disks, and magneto-optical disks.

Another Example Embodiment 1

FIG. 9 is a block diagram showing the configuration of an electronic device that is another example embodiment of the present invention.

Referring to FIG. 9, electronic device 600, which is connected to a network by way of a wireless access point or a cable, includes a communication unit 601 and a control unit 602. Electronic device 600 is equivalent to, for example, wireless LAN-compliant projector 100. In this case, the network is, for example, an intranet.

Communication unit 601 is provided with at least a wireless communication capability. Communication unit 601 is able to connect to a network by way of a wireless access point or a cable. For example, communication unit 601 is able to communicate wirelessly with a wireless access point. Control unit 602 controls the communication operations of communication unit 601. Control unit 602 causes a beacon signal that contains the identification information of electronic device 600 to be transmitted from communication unit 601 while connected to a network by way of a wireless access point or a cable. The identification information includes information of an IP address that can identify electronic device 600 on the network.

Electronic device 600 is preferably connected to an intranet on the premise that electronic device 600 transmits a beacon signal that includes at least an IP address. For example, the connection of electronic device 600 to an intranet is presupposed in order that a session request be received from a wireless LAN terminal.

In electronic device 600 of the present example embodiment, communication unit 601 may receive a session start request from a terminal that has received a beacon signal by way of wireless access points or the cable. In this case, the beacon signal may be transmitted by broadcast.

In electronic device 600, control unit 602 determines whether the assignment of an IP address is to be carried out by way of a wireless access point or a cable, and when assignment is to be carried out by way of a cable (for example, via a wired LAN), control unit 602 may cause communication unit 601 to transmit a beacon signal, or when assignment is to be carried out by way of a wireless access point (for example, via a wireless LAN), control unit 602 may cause communication unit 601 to transmit a beacon signal when the first mode has been set for communication with a wireless LAN terminal by way of a wireless access point.

Still further, when the assignment of the IP address is to be carried out by way of wireless access points, control unit 602 may cause communication unit 601 to not transmit a beacon signal when the first mode has not been set. For example, when the assignment of an IP address is by way of wireless access points, control unit 602 does not cause communication unit 601 to transmit a beacon signal when the second mode for carrying out wireless communication directly with the wireless LAN terminal has been set.

The beacon signal described above contains at least the IP address of electronic device 600. The first mode is, for example, the infrastructure mode, and the second mode is, for example, the ad hoc mode or the access point mode. Here, the access point mode operates with electronic device 600 as its own access point that performs wireless communication directly with a wireless LAN terminal. Although a beacon signal is transmitted in either the ad hoc mode or access point mode, the beacon signal does not contain an IP address.

FIG. 11 shows the actual procedures of determining whether to perform transmission of a beacon signal that contains an IP address. The determination operation is next described with reference to FIG. 11.

As shown in FIG. 11, control unit 602 determines whether assignment of an IP address is to be carried out by way of a wired LAN (Step S401). If this determination is "Yes," control unit 602 causes communication unit 601 to transmit a beacon signal that contains the IP address (Step S402).

If the determination of Step S401 is "No," control unit 602 determines whether to carry out assignment of an IP address by way of a wireless LAN (Step S403). If this determination is "Yes," control unit 602 determines whether the infrastructure mode has been set (Step S404).

If the determination of Step S404 is "Yes," control unit 602 carries out the beacon transmission of Step S402. If the determination of Step S404 is "No," control unit 602 does not carry out beacon signal transmission by communication unit 601 (Step S405).

When the determination of Step S403 is "No," control unit 602 carries out the determination of Step S401.

After executing the process of Step S402 or Step S405, control unit 602 ends the determination operation.

In addition, electronic device 600 may further include a code generation unit that generates information of a character string. In this case, the identification information of electronic device 600 may further contain information of a character string that is generated by the code generation unit. Still further, the identification information of electronic device 600 may be an SSID.

Electronic device 600 may further include a display unit that displays an image. In this case, the display unit may display an image that shows a character string that was generated by code generation unit.

Electronic device 600 may further include a projection unit that projects an image. In this case, the projection unit may project an image that shows the character string that was generated by the code generation unit.

The IP address of electronic device 600 may further be assigned by DHCP.

The processing or operation control of each unit such as communication unit 601 by control unit 602 may also be realized by the execution of a program by a computer.

FIG. 10 is a block diagram showing the configuration of a wireless LAN terminal that is another example embodiment of the present invention.

Referring to FIG. 10, wireless LAN terminal 700 is a wireless LAN terminal that is connected to a network by way of a wireless access point or a cable and includes communication unit 701, control unit 702, and operation unit 703.

Communication unit 701 is provided with at least a wireless communication capability. Communication unit 701 is able to connect to a network by way of a wireless access point or a cable. For example, communication unit 701 is able to communicate wirelessly with a wireless access point. Operation unit 703 receives character input.

Control unit 702 controls the communication operations of communication unit 701. Control unit 702 receives the input of predetermined authentication information by way of operation unit 703. When communication unit 701 receives, from electronic device 600 that is connected to the network, a wireless signal that contains predetermined authentication information and information of the IP address of electronic device 600 not by way of either a wireless access point or a cable, control unit 702 causes the transmission of a session start request in which the IP address is set as the destination address from communication unit 701 by way of a wireless access point or a cable (for example, by way of a wireless LAN or a wired LAN). Communication unit 701 is connected to a network by way of a wireless access point or a cable (for example, by way of a wireless LAN or by way of a wired LAN) before input of the predetermined authentication information or before the reception of a wireless signal. Here, the predetermined authentication information is information of a character string that was generated by electronic device 600, for example, a PIN code. The wireless signal is, for example, a beacon signal. The network is, for example, an intranet.

For example, when the user of wireless LAN terminal 700 enters a PIN code, wireless LAN terminal 700 collects beacon signals and a session is finally started between wireless LAN terminal 700 and electronic device 600. As a prerequisite of this series of operations, wireless LAN terminal 700 is preferably connected to the intranet before the PIN code is entered or before wireless LAN terminal 700 collects beacon signals. In this case, after the input of the PIN code or after the collection of the beacon signals, the time required until the start of the session can be shortened, and convenience can be improved.

In addition, wireless LAN terminal 700 may be modified as shown below.

Wireless LAN terminal 700 is made up of communication unit 701 that is provided with at least a wireless communication capability and control unit 702 that controls the operation of communication unit 701. Control unit 702, while connected to a network by way of a wireless access point or a cable, upon reception by communication unit 701 from an electronic device of a signal that contains the IP address of the electronic device not by way of either the wireless access point or the cable, causes a session start request in which the IP address is set as the destination address to be transmitted from communication unit 701 by way of a wireless access point or a cable.

In addition, in wireless LAN terminal 700 of the present example embodiment, processing or operation control of each unit such as communication unit 701 by control unit 702 may also be realized by causing a computer to execute a program.

A wireless LAN system is made up of electronic device 600 shown in FIG. 9 and wireless LAN terminal 700 shown in FIG. 10. Electronic device 600 and wireless LAN terminal 700 communicate by way of wireless access points. By means of this wireless LAN system, wireless LAN terminal 700 can automatically connect to electronic device 600 by way of wireless access points, and moreover, a shared server can be accessed from wireless LAN terminal, and convenience can therefore be improved.

Although the present invention has been described with reference to an example embodiment, the present invention is not limited to the above-described example embodiment. The configuration and details of the present invention are open to various modifications within the scope of the present invention that will be clear to one of ordinary skill in the art.

For example, the processes and configurations next described in (1-1)-(1-3) can also be applied.

(1-1) Beacon Signal Transmission: Until Establishment of Session

When an IEEE802.11 frame is used, the type of frame used in the transmission of a beacon signal is a "management frame." The MAC address (receiver address) of a recipient of this management frame is not particularly designated and may be, for example, "FF:FF:FF:FF:FF:FF". As a result, the beacon signal is transmitted by broadcast. In addition, the MAC address of the recipient is not designated, and the beacon signal therefore is not transmitted to the network by way of wireless access point 300.

For example, in the procedure of FIG. 5, the beacon signal is transmitted (Step S113) after a wireless connection has been established between wireless LAN-compliant projector 100 and wireless access points 300 (after Step S105), and furthermore, after an IP address has been assigned (after Steps S107-109). In other words, the beacon signal is transmitted with wireless LAN-compliant projector 100 connected to the network by way of wireless access point 300.

In addition, in the procedures of FIG. 7, the beacon signal preferably continues to be transmitted at least until a session is established between wireless LAN-compliant projector 100 and wireless LAN terminal 200 (up to Step S313).

(1-2) Data Transmission/Reception: After Establishment of Session

When a session is started between wireless LAN-compliant projector 100 and wireless LAN terminal 200 by way of wireless access points 300, the transmission and reception of data are carried out by way of access points 300. The type of frame used in the transmission and reception of data is a "data frame."

The MAC address of the recipient of data frames that are transmitted from wireless LAN terminal 200 is assumed to be the MAC address of wireless access point 300 (the MAC address of the destination is assumed to be the MAC address of wireless LAN-compliant projector 100). The data that are transmitted from wireless LAN terminal 200 are, for example, data of images that are displayed on wireless LAN-compliant projector 100.

On the other hand, the MAC address of the recipient of data frames that are transmitted from wireless LAN-compliant projector 100 is also assumed to be the MAC address of wireless access point 300 (the MAC address of the destination is assumed to be the MAC address of wireless LAN terminal 200). The data transmitted from wireless LAN-compliant projector 100 is, for example, an ACK for reporting that the image data have been normally received.

(1-3) Beacon Signal Transmission: After Establishment of Session

The beacon signal may be transmitted even after a session has been established between wireless LAN-compliant projector 100 and wireless LAN terminal 200. By transmitting the beacon signal after a session has been established, for example, another session can be established between wireless LAN-compliant projector 100 and a terminal other than wireless LAN terminal 200 with which the session has been established.

In this case, wireless LAN-compliant projector 100 simultaneously carries out the transmission of the beacon signal by broadcast and the transmission of data to wireless LAN terminal 200. The MAC address of the recipient is as described above.

Wireless communication unit 105 of wireless LAN-compliant projector 100 has antennas that are used in transmission and reception. When there is one antenna for transmission, the transmission of the beacon signal and the transmission of data are performed in time divisions. For example, the beacon signal is periodically transmitted each 100 milliseconds and data are transmitted in the remaining time.

When there are a plurality of antennas for transmission, one of these antennas is used to perform transmission of the beacon signal, and the other antennas can be used to simultaneously transmit data. In this case as well, the single antenna that is used to perform the transmission of the beacon signal may be used to transmit data in time divisions.

Actual examples of the frame structure are described below.

For example, in the procedures of FIG. 5, frames of the following structure may be used in Step S103.
Frame type: Data frame
Receiver address: MAC address of wireless access point 300
Destination address: FF:FF:FF:FF:FF:FF
Transmitter address: MAC address of wireless LAN-compliant projector 100

Frames of the following structure may further be used in Step S104:
Frame type: Data frame
Receiver address: MAC address of wireless LAN-compliant projector 100
Destination address: FF:FF:FF:FF:FF:FF
Transmitter address: MAC address of wireless access point 300

Further, frames of the following structure may be used in Step S106:
Frame type: Data frame
Receiver address: MAC address of wireless access point 300
Destination address: FF:FF:FF:FF:FF:FF
Transmitter address: MAC address of wireless LAN-compliant projector 100

Further, frames of the following structure may be used in Step S107:
Frame type: Data frame
Receiver address: MAC address of wireless LAN-compliant projector 100
Destination address: MAC address of wireless LAN-compliant projector 100
Transmitter address: MAC address of wireless access point 300

In addition, in the procedures of FIG. 6, frames of the following structure may be used in Step S202:
Frame type: Data frame
Receiver address: MAC address of wireless access point 300
Destination address: FF:FF:FF:FF:FF:FF
Transmitter address: MAC address of wireless LAN terminal 200

Further, frames of the following structure may be used in Step S203:
Frame type: Data frame
Receiver address: MAC address of wireless LAN terminal 200
Destination address: FF:FF:FF:FF:FF:FF
Transmitter address: MAC address of wireless access point 300

Further, frames of the following structure may be used in Step S205:
Frame type: Data frame
Receiver address: MAC address of wireless access point 300
Destination address: FF:FF:FF:FF:FF:FF
Transmitter address: MAC address of wireless LAN terminal 200

Further, frames of the following structure may be used in Step S206:
Frame type: Data frame
Receiver address: MAC address of wireless LAN terminal 200
Destination address: MAC address of wireless LAN terminal 200
Transmitter address: MAC address of wireless access point 300

In addition, frames of the following structure may be used in Step S300 in the procedures of FIG. 7:
Frame type: Management frame
Receiver address: FF:FF:FF:FF:FF:FF
Destination address: FF:FF:FF:FF:FF:FF
Transmitter address: MAC address of wireless LAN-compliant projector 100

Further, frames of the following structure may be used in Step S307:
Frame type: Data frame
Receiver address: MAC address of wireless access point 300
Destination address: MAC address of wireless LAN-compliant projector 100
Transmitter address: MAC address of wireless LAN terminal 200

Further, frames of the following structure may be used in Step S309:
Frame type: Data frame
Receiver address: MAC address of wireless LAN-compliant projector 100
Destination address: MAC address of wireless LAN-compliant projector 100
Transmitter address: MAC address of wireless access point 300

Still further, frames of the following structure may be used in Step S310:
Frame type: Data frame
Receiver address: MAC address of wireless access point 300
Destination address: MAC address of wireless LAN terminal 200
Transmitter address: MAC address of Wireless LAN-compliant projector 100

Finally, frames of the following structure may be used in Step S312:
Frame type: Data frame
Receiver address: MAC address of wireless LAN terminal 200
Destination address: MAC address of wireless LAN terminal 200
Transmitter address: MAC address of wireless access point 300

Another Example Embodiment 2

In the wireless LAN system shown in FIG. 1, wireless LAN-compliant projector 100 and wireless LAN terminal 200 are connected to intranet 500 by way of wireless access points 300. In this case, wireless LAN paths link between wireless LAN-compliant projector 100 and wireless access point 300 and between wireless LAN terminal 200 and wireless access point 300.

In contrast, in a wireless communication system that is another example embodiment of the present invention, a wireless LAN-compliant projector that is an example of an electronic device and a wireless LAN terminal are connected not by way of a wireless LAN but directly by way of a wired LAN to an intranet that is one example of a network.

FIG. 12 shows the configuration of a wireless communication system that is another example embodiment of the present invention. Referring to FIG. 12, the wireless communication system includes wireless LAN-compliant projector 100-1, wireless LAN terminal 200-1, DHCP server 400, and intranet 500. DHCP server 400 and intranet 500 are the same as the components shown in FIG. 1.

Wireless LAN-compliant projector 100-1 has, in addition to the same capabilities as wireless LAN-compliant projector 100 shown in FIG. 1, the capability to connect to a wired LAN.

FIG. 13 is a block diagram showing the configuration of wireless LAN-compliant projector 100-1.

Wireless LAN-compliant projector 100-1 shown in FIG. 13 includes light source 101, video-synthesizing projection unit 102, frame buffer 103, OSD unit 104, and wireless/wired LAN unit 100c. Light source 101, video-synthesizing projection unit 102, frame buffer 103, and OSD unit 104 are basically the same as the components shown in FIG. 2.

Wireless/wired LAN unit 100c includes wireless communication unit 105, wired communication unit 105a, network control unit 106, SSID generation unit 107, and PIN code generation unit 108. Wireless communication unit 105, network control unit 106, SSID generation unit 107, and PIN code generation unit 108 are basically the same as the components shown in FIG. 2.

Wired communication unit 105a is electrically connected to network control unit 106. Wired communication unit 105a can connect to a wired LAN. Network control unit 106 controls the operation of each of wireless communication unit 105 and wired communication unit 105a. Wired communication unit 105a is able to connect to intranet 500 by way of a wired LAN. When wired communication unit 105a is connected to intranet 500, network control unit 106 causes wireless communication unit 105 to function as a communication unit that transmits a beacon signal.

Network control unit 106, while wired communication unit 105a is connected to intranet 500 by way of a wired LAN, causes a beacon signal that contains identification information of wireless LAN-compliant projector 100-1 to be transmitted from wireless communication unit 105. The identification information of wireless LAN-compliant projector 100-1 contains authentication information (for example, a PIN code) and information of an IP address that can identify wireless LAN-compliant projector 100-1 on intranet 500.

FIG. 14 is a block diagram showing the configuration of wireless LAN terminal 200-1. Wireless LAN terminal 200-1 shown in FIG. 14 includes touch panel unit 201, user interface control unit 202, frame buffer 203, wireless communication unit 204, wired communication unit 204a, network control unit 205, and SSID analysis unit 206. Touch panel unit 201, user interface control unit 202, frame buffer 203, wireless communication unit 204, network control unit 205, and SSID analysis unit 206 are basically the same as the components shown in FIG. 3.

Wired communication unit 204a is electrically connected to network control unit 205. Wired communication unit 204a is able to connect to a wired LAN. Network control unit 205 controls the communication operations of each of wireless communication unit 204 and wired communication unit 204a. Wired communication unit 204a is able to connect with intranet 500 by way of a wired LAN. When wired communication unit 204a is connected to intranet 500, network control unit 205 causes wireless communication unit 204 to function as a communication unit that receives a beacon signal.

Network control unit 205 receives predetermined authentication information (for example, a PIN code) input by way of touch panel unit 201. Wireless communication unit 204 receives a beacon signal that contains the above-described predetermined authentication information and information of the IP address of wireless LAN-compliant projector 100-1 from wireless LAN-compliant projector 100-1 that is connected to intranet 500. Network control unit 205 causes a session start request, in which the IP address is set as the destination address, to be transmitted from wired communication unit 204a by way of a wired LAN. Wired communication unit 204a is connected to intranet 500 by way of a wired LAN before the input of the above-described predetermined authentication information or before the reception of a beacon signal.

In each of the above-described example embodiments, a wireless LAN terminal preferably connects to a wireless LAN-compliant projector by the following procedures 1-5.

(Procedure 1) The establishment of a wireless connection (for example, S202-S204 of FIG. 6)

(Procedure 2) The establishment of a connection to an intranet (for example, S205-S208 of FIG. 6)

(Procedure 3) The input of a PIN code of a wireless LAN-compliant projector that is the object of connection (for example, S209 of FIG. 6 and S301-S302 of FIG. 7)

(Procedure 4) The acquisition of an IP address from the beacon signal of a wireless LAN-compliant projector (for example, S303-S306 of FIG. 7)

(Procedure 5): The start of a session with a wireless LAN-compliant projector (for example, Steps S307-S313 of FIG. 7)

The reasons for carrying Procedures 1-5 above are as follows:

In order for a wireless LAN terminal to start a session with a wireless LAN-compliant projector, both the wireless LAN terminal and the wireless LAN-compliant projector must connect to an intranet by which the two can communicate. As a result, Procedure 1 and Procedure 2 must be completed before Procedure 5.

In addition, Procedure 3 and Procedure 4 can be implemented before Procedure 1. However, the IP address that is acquired from the beacon signal of a wireless LAN-compliant projector is information that is necessary for starting the session of Procedure 5, and Procedure 3 and Procedure 4 are preferably implemented after Procedure 2 in order to immediately start a session after the acquisition of the IP address.

There is further the advantage of eliminating the trouble of Procedure 1 and Procedure 2. Wireless LAN terminal typically holds the SSID and security information of access points that were connected in the past. Upon detecting an adjacent access point that was connected in the past, and moreover, that has a high signal level, a wireless LAN terminal automatically establishes a wireless connection to the access point. When a wireless connection is established, the wireless LAN terminal then establishes a connection to the intranet to which the access point is connected. If a wireless LAN-compliant projector is connected to an in-house intranet, an in-house user having a wireless LAN terminal may perform the procedures up to establishing a connection to the in-house intranet without the conscious involvement of the user.

This application claims the benefits of priority based on PCT/JP2017/20590 for which application was submitted on Jun. 2, 2017 and incorporates by citation all of the disclosures of that application.

EXPLANATION OF REFERENCE NUMBERS 100, 600 wireless LAN-compliant projector
100a screen
100b wireless LAN unit
101 light source
102 video-synthesizing projection unit
103 frame buffer
104 OSD unit
105 wireless communication unit
106 network control unit
107 SSID generation unit
108 PIN code generation unit
200 wireless LAN terminal
300 wireless access point
400 DHCP server
500 intranet
601 identification information generation unit
602 wireless communication unit
603 control unit

The invention claimed is:

1. An electronic device that is connected to a network by way of a wireless access point or a cable, the electronic device comprising:
   a communication unit provided with at least a wireless communication capability; and
   a control unit that controls communication operations of said communication unit,
   wherein said control unit, while connected to said network by way of said wireless access point or said cable, causes said communication unit to transmit a beacon signal that includes identification information of said electronic device,
   wherein said identification information includes information of an IP address that is configured to identify said electronic device on said network, and
   wherein said communication unit receives a session start request, in which said IP address is set as a destination address, by way of said wireless access point or said cable from a terminal that has received said beacon signal.

2. The electronic device as set forth in claim 1, wherein said control unit determines whether an assignment of said IP address is to be carried out by way of one of said wireless access point or said cable, and
   wherein, when said assignment of said IP address is to be carried out by way of said cable, said control unit causes said communication unit to carry out transmission of said beacon signal, or alternatively, when said assignment of said IP address is to be carried out by way of said wireless access point, said control unit causes said communication unit to carry out transmission of said beacon signal when an operating mode of communicating with said wireless LAN terminal by way of said wireless access point has been set.

3. The electronic device as set forth in claim 2, wherein, when said assignment of said IP address is to be carried out by way of said wireless access point, said control unit does not cause said communication unit to transmit said beacon signal when said operating mode has not been set.

4. The electronic device as set forth in claim 1, wherein said beacon signal is transmitted by broadcast.

5. The electronic device as set forth in claim 1, further comprising a code generation unit that generates information of a character string,
   wherein said identification information further contains said information of a character string.

6. The electronic device as set forth in claim 5, wherein said identification information comprises a Service Set Identifier (SSID).

7. The electronic device as set forth in claim 5, further comprising a display unit that displays images,
   wherein said display unit displays an image that indicates said character string.

8. The electronic device as set forth in claim 5, further comprising a projection unit that projects images,
   wherein said projection unit projects an image that indicates said character string.

9. The electronic device as set forth in claim 1, wherein said IP address is assigned by a Dynamic Host Configuration Protocol (DHCP).

10. A wireless Local Area Network (LAN) terminal that is connected to a network by way of a wireless access point or a cable, the wireless LAN terminal comprising:
    an operation unit that accepts character input;
    a communication unit provided with at least a wireless communication capability; and a control unit that controls communication operations of said communication unit, wherein said control unit accepts input of predetermined authentication information by way of said operation unit, wherein, when said communication unit receives, from an electronic device that is connected to said network, a wireless signal that contains said predetermined authentication information and information of an IP address of said electronic device not by way of one of said wireless access point or said cable, said control unit causes said communication unit to transmit a session start request, in which said IP address is set as a destination address, by way of said wireless access point or said cable, and wherein said communication unit is connected to said network by way of said wireless access point or said cable before input of said predetermined authentication information or before reception of said wireless signal.

11. The electronic device as set forth in claim 1, wherein said electronic device is connected to the network by the wireless access point.

12. The electronic device as set forth in claim 1, wherein said electronic device is connected to the network by the cable.

13. The electronic device as set forth in claim 1, wherein said control unit determines an assignment of said IP address is to be carried out by said cable, and wherein said control unit causes said communication unit to carry out transmission of said beacon signal.

14. The electronic device as set forth in claim 1, wherein said control unit determines an assignment of said IP address is to be carried out by said wireless access point, and wherein said control unit causes said communication unit to carry out transmission of said beacon signal when an operating mode of communicating with said wireless LAN terminal by way of said wireless access point has been set.

15. A wireless Local Area Network (LAN) terminal that is connected to a network by way of a wireless access point or a cable, the wireless LAN terminal comprising:

a communication unit that is provided with at least a wireless communication capability; and a control unit that controls operations of said communication unit, wherein, while connected to said network by way of said wireless access point or said cable, when said communication unit receives from an electronic device a signal that contains information of an IP address of said electronic device not by way of one of said wireless access point or said cable, said control unit causes said communication unit to transmit a session start request, in which said IP address is set as a destination address, by way of said wireless access point or said cable.

16. A wireless Local Area Network (LAN) terminal connection method that is carried out in an electronic device that is connected to a network by way of a wireless access point or a cable, said method comprising:

transmitting a beacon signal that contains identification information of said electronic device while connected to said network by way of said wireless access point or said cable, wherein said identification information includes information of an IP address that is configured to identify said electronic device on said network, and wherein a communication unit of said electronic device receives a session start request, in which said IP address is set as a destination address, by way of said wireless access point or said cable from a terminal that has received said beacon signal.

17. A wireless Local Area Network (LAN) terminal connection method that is carried out in a wireless LAN terminal that is connected to a network by way of a wireless access point or a cable, said method comprising:

receiving input of predetermined authentication information and receiving from an electronic device that is connected to said network a wireless signal that contains said predetermined authentication information and information of the IP address of that electronic device not by way of either said wireless access point or said cable;

transmitting a session start request in which said IP address is set as a destination address by way of said wireless access point or said cable; and connecting that wireless Local Area Network (LAN) terminal to said network by way of said wireless access point or said cable before input of said predetermined authentication information or before reception of said wireless signal.

* * * * *